Dec. 27, 1960 R. L. DALTON 2,966,104
RANGEFINDER FOR PHOTOGRAPHIC CAMERAS
Filed May 8, 1958
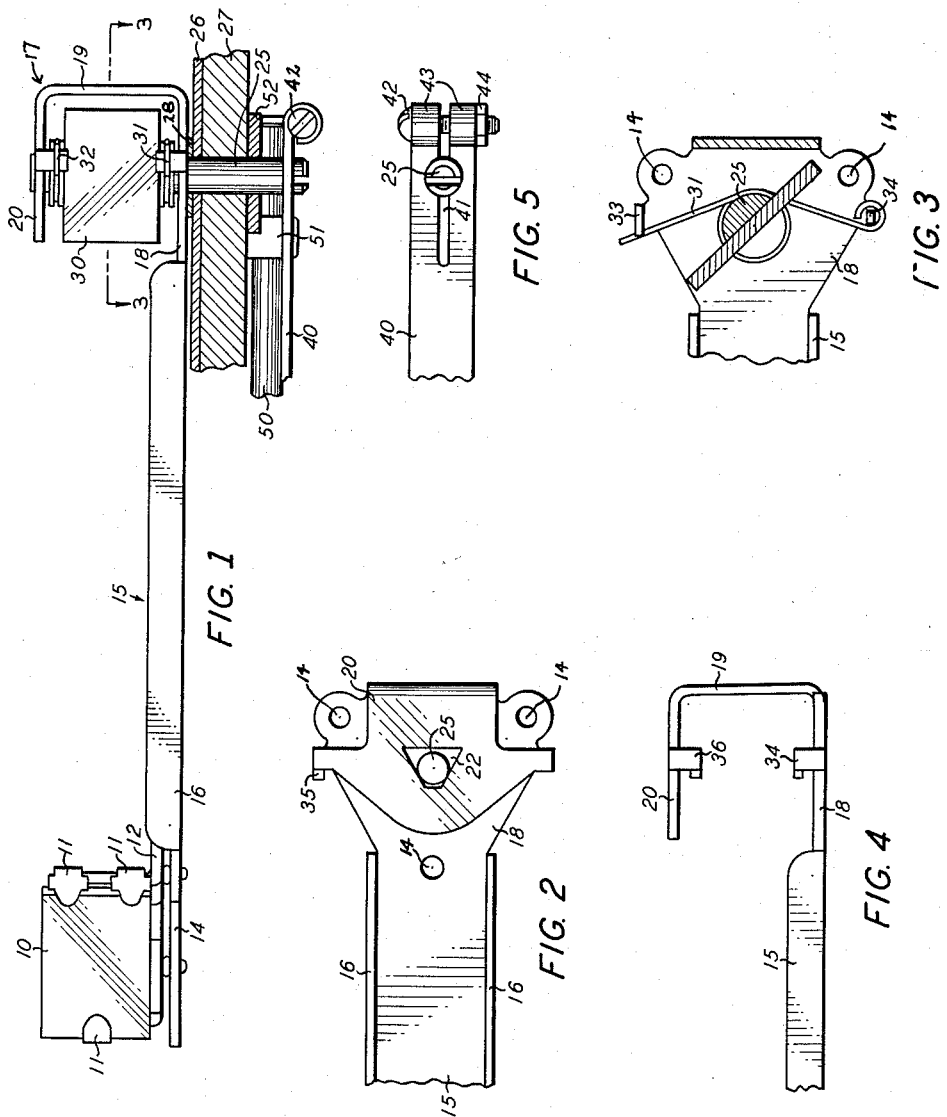
INVENTOR.
Robert L. Dalton
BY
ATTORNEY

United States Patent Office 2,966,104
Patented Dec. 27, 1960

2,966,104

RANGEFINDER FOR PHOTOGRAPHIC CAMERAS

Robert L. Dalton, Pittsford, N.Y., assignor to Graflex, Inc., Rochester, N.Y., a corporation of Delaware Filed May 8, 1958, Ser. No. 733,977

4 Claims. (Cl. 95—44)

The present invention relates to rangefinders for photographic cameras, and more particularly to coupled rangefinders for cameras. In a more specific aspect, the invention relates to a mirror mounting for a coupled rangefinder and to means for connecting the mirror mounting to the actuating mechanism for the rangefinder. Still more specifically, the invention relates to a rangefinder of the general type shown in the Steiner and Dalton U.S. Patent No. 2,713,815, granted July 26, 1956.

In a camera rangefinder of the type to which the present invention relates, there are two mirrors or reflectors, one of which is fixed and the other of which is rotatable. The fixed mirror or reflector is disposed in the rangefinder casing opposite one of the window openings in the casing; and the rotatable mirror or reflector is disposed opposite the other window opening of the casing. The rotatable mirror is opaque and is coupled to a slide that carries the lens board or support for the front lens of the camera so that, when the slide is moved in or out along the camera bed, the rotatable mirror will be swung on its axis of rotation. The eyepiece of the rangefinder is aligned with the fixed, semi-transparent mirror. Upon looking into the eyepiece, then, the photographer sees two images of the object to be photographed, one reflected from the rotary mirror onto the rear face of the fixed mirror and thence to the eyepiece, and the other, visible directly through the fixed, semi-transparent mirror. By adjusting the slide forward or back these two images may be brought together, and when this is done the camera is in proper focus.

Heretofore the rotatable mirror has been secured at one end of a shaft which extends through juxtaposed side walls of the camera and rangefinder casings, and which is fastened at its other end within the camera casing by a set screw to the actuating arm which rotates the shaft and mirror in response to adjustment of the slide. The shaft has been journaled in a bushing or bearing extending through the adjoining walls of the camera and rangefinder casings.

Obviously, the different angular positions of the rotatable mirror have to correspond precisely to different rectilinear positions of the slide; otherwise the camera will be improperly focused and poor pictures will result. It is difficult, however, to broach a long hole straight and this has made the required precision of positioning of the shaft in its bearing difficult to attain. Moreover, with prior constructions, even after the rotatable mirror has been precisely adjusted relative to the stationary mirror it is difficult to prevent it rotating ever so slightly relative to the actuating arm when tightening up the set-screw which secures the mirror shaft to the actuating arm. Yet any such relative rotation will affect the precision of focusing.

One object of the present invention is to provide a simpler, more precise mounting for the rotatable mirror of a camera rangefinder.

Another object of the invention is to provide a mirror mounting which will be easier to manufacture.

Still another object of the invention is to provide a mirror mounting which can be connected to the actuating mechanism for the rangefinder without disturbing the angular position of the rotatable mirror after it has been adjusted relative to the stationary mirror of the rangefinder.

Other objects of the invention will be apparent hereinafter from the specification and from the recital of the appended claims when read in connection with the accompanying drawing.

In the drawing:

Fig. 1 is a fragmentary vertical view showing the elements of a rangefinder constructed according to the present invention, and the means for coupling the same to the actuating mechanism therefor, the rangefinder and camera casings being broken away and being shown fragmentarily only in section;

Fig. 2 is a fragmentary side view of the mounting for the rotatable mirror of this rangefinder, this view being taken at right angles to the view of Fig. 1;

Fig. 3 is a section on the line 3—3 of Fig. 1 looking in the direction of the arrows;

Fig. 4 is a fragmentary front view of the mounting for the rotary mirror, looking in the same direction as Fig. 1 but with the mirror removed; and Fig. 5 is a fragmentary view taken at right angles to Fig. 1 and showing the means for connecting the shaft of this mirror mounting to the actuatnig arm therefor.

The rangefinder illustrated includes a fixed mirror 10, which may be secured by means of spring clips 11, or in any other suitable manner, to a bracket or support 12 which is angularly adjustable in known manner on a beam 15. The mounting for this mirror forms no part of the present invention, and may be similar to that disclosed in the Smith et al. Patent No. 2,693,744, granted November 9, 1954. This mirror here is semi-transparent.

The beam 15 is channel-shaped for the major portion of its length, and has parallel sides 16. It is rigidly secured to one wall of the casing 26 of the rangefinder by screws which pass through holes 14 in the beam. Spacers or washers may be mounted around the securing screws and interposed between the beam and the casing wall to space the beam from the casing wall.

At the end of the beam remote from the end which carries the mirror 10, the side walls 16 of the beam 15 are cut away, and the beam is formed into a generally U-shaped supporting section 17 having a base portion 18, an upright portion 19 extending at right angles to the base portion 18, and a top portion 20 which overlies the base portion 18, and which is parallel thereto. The top portion 20 is formed with a triangular hole 22 (Fig. 2) therein, which is aligned with a similar hole formed in the base portion 18. These holes may be stamped out, or broached.

A shaft 25 is mounted to extend through these holes and through one side wall of the rangefinder casing 26 and through the adjacent side wall of the camera box or casing 27. A washer 28 may be interposed between beam 15 and the side wall of the rangefinder casing to space the beam from the casing wall. Between the wings 18 and 20 of the supporting section 17 the shaft 25 is slabbed off diametrically; and an opaque mirror 30 is cemented to the plane diametrally-extending slabbed side of the shaft.

The shaft 25 is continuously pressed toward the apex portions of the two triangular holes 22 in the wings 18 and 20 by a pair of springs 31 and 32 (Fig. 1). The spring 31 (Fig. 3) is coiled around the shaft 25, and seats at one end against a lug 33 formed on the base portion 18, and is hooked at its other end around a lug 34 which projects upwardly from this base portion. The spring 32 similarly wraps around the shaft 25, and abuts at one end against a tab 35 (Fig. 2) formed on the overhang portion 20, and is hooked at its other end over a depending lug 36 (Fig. 4) of this portion 20.

The holes in the adjoining walls of the rangefinder casing and of the camera box, through which the shaft 25 passes, are slightly larger in diameter than the diameter of the shaft so that the shaft has clearance with reference to these holes and its position is determined by triangular holes 22 and the springs which press the shaft into the narrowest portions of these holes.

Motion may be transmitted from the focusing slide of the camera through plungers, a series of balls, and a cam in a manner similar to that described in the Steiner and Dalton Patent No. 2,713,815 above mentioned, the cam operating on an arm 40 (Fig. 1), which is secured to the shaft 25. This arm is split at the shaft end, as denoted at 41 (Fig. 5), to receive the shaft, and is clamped to the shaft by a screw 42 which passes through two rolled-over portions formed on the arm 40 at opposite sides of the slit 41. A nut 44 which threads onto the screw serves to tighten the split portions about the shaft 25 without rotating the shaft after the mirror 30 has been adjusted to the correct position relative to the stationary mirror 10 and to the focusing slide of the camera. Hence, the arm 40 can be attached to the shaft without affecting focusing. 50 (Fig. 1) denotes a tube, similar to the tube 50 of the Steiner and Dalton Patent No. 2,713,815, in which the cam that actuates the arm 40 is mounted. 51 denotes a wing, similar to the wing 75 of Patent No. 2,713,815, which is bent laterally from the bracket, on which the tube 50 is mounted, to hold the tube against lateral movement relative to that bracket. 52 is an arm of this bracket, similar to the arm 78 of Patent No. 2,713,815. The shaft 25 passes through this arm.

The mirror mounting of the present invention is simpler in construction than prior mountings. It eliminates a long broached hole for the mirror shaft. The springs 31 and 32 keep the mirror in position; these springs press the shaft into the narrow parts of the holes 22. The mirror can be properly oriented with reference to the focusing slide of the camera and will stay properly oriented when the shaft 25 is connected to the actuating arm 40 because the screw 42 can be tightened to draw the arm 40 snug on the shaft 25 without rotating the shaft. The present mounting provides therefore a greatly improved structure over prior mounting for the rotatable mirror of a photographic rangefinder.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. A rangefinder for a photographic camera having a casing, a pair of cooperating reflectors mounted in said casing, one of which is rotatable, and means for supporting the rotatable reflector comprising a beam having a main portion secured at one end to said casing, said beam being bent upon itself at said one end to provide an arm spaced from the main portion of said beam and overlying the main portion of said beam and extending in spaced, parallel relation to the main portion of said beam, said arm and said main portion having aligned triangular holes therethrough, a rotary shaft to which said rotatable reflector is secured intermediate the ends of said shaft and between said main portion and said arm, said shaft passing through said holes, and spring means for constantly urging said shaft toward the apices of said holes.

2. A rangefinder as claimed in claim 1 in which said shaft is slabbed off diametrally between said arm and the main portion of said beam, and in which the rotatable mirror is secured to the diametral plane slabbed-off side of the shaft.

3. A rangefinder as claimed in claim 2 in which said spring means comprises a pair of coil springs, each of which is coiled intermediate its ends about said shaft, and one of which abuts at opposite ends against said arm, and the other of which abuts at opposite ends against the main portion of said beam.

4. The combination with a photographic camera, of a rangefinder, said camera having a casing, and said rangefinder comprising a casing, a pair of reflectors, one of which is rotatable, said rangefinder casing being mounted in juxtaposition to one wall of the camera casing, and means for rotatably supporting the rotatable reflector comprising a beam secured at one end within the rangefinder casing, said beam being bent upon itself at said one end to have a portion overlying the main portion of said beam and extending in spaced, parallel relation thereto, said overlying portion and the main portion of said beam having axially aligned triangular shaped holes therethrough, a shaft to which said rotatable reflector is secured between said main portion and said overlying portion of said beam, said shaft extending through said holes and through said rangefinder casing and through the juxtaposed wall of the camera and terminating at one end within the camera, means for rotating said shaft, comprising an arm mounted within the camera and adapted to be moved upon focusing adjustment of the camera, said arm being slotted adjacent one end diametrally of said shaft to receive the terminal end of said shaft and having said one end curled upon itself, a clamping bolt disposed in said curled end of said arm for clamping said arm to said shaft, and a pair of springs mounted within the rangefinder casing for urging said shaft toward the apices of said triangular holes, one of said springs being coiled about said shaft and having its opposite ends abutting against said overlying portion of said beam, and the other of said springs being coiled about said shaft and having its opposite ends abutting against the main portion of said beam.

References Cited in the file of this patent

UNITED STATES PATENTS

| | | |
|---|---|---|
| 1,057,658 | Nichols | Apr. 1, 1913 |
| 1,505,778 | Hansen | Aug. 19, 1924 |
| 2,693,744 | Smith et al. | Nov. 9, 1954 |
| 2,713,815 | Steiner et al. | July 26, 1955 |